(12) United States Patent
Wang

(10) Patent No.: US 10,210,064 B2
(45) Date of Patent: Feb. 19, 2019

(54) SYSTEMS AND METHODS FOR DEVICE COMPATIBILITY TESTING AND REPORTING

(71) Applicant: Google Inc., Mountian View, CA (US)

(72) Inventor: Zhonglei Wang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 171 days.

(21) Appl. No.: 15/247,357

(22) Filed: Aug. 25, 2016

(65) Prior Publication Data
US 2017/0060713 A1 Mar. 2, 2017

(30) Foreign Application Priority Data
Aug. 27, 2015 (EP) .................................... 15182745

(51) Int. Cl.
*G06F 11/00* (2006.01)
*G06F 11/22* (2006.01)
(Continued)

(52) U.S. Cl.
CPC ...... *G06F 11/2236* (2013.01); *G06F 11/2294* (2013.01); *G06F 11/26* (2013.01);
(Continued)

(58) Field of Classification Search
CPC ............. G06F 11/2221; G06F 11/2236; G06F 11/2294; G06F 11/26; G06F 11/3692; G06F 17/30345; G06F 17/30477
See application file for complete search history.

(56) References Cited

U.S. PATENT DOCUMENTS 7,502,972 B1 3/2009 Chilukuri et al.
7,673,288 B1 * 3/2010 Stroomer ............ G06F 11/3692
703/14
(Continued)

FOREIGN PATENT DOCUMENTS

CN 103077115 5/2013
CN 104572440 4/2015
(Continued)

OTHER PUBLICATIONS

"Extended European Search Report", EP Application No. 15182745.8, dated Nov. 13, 2015, 10 pages.
(Continued)

*Primary Examiner* — Joshua P Lottich
(74) *Attorney, Agent, or Firm* — Colby Nipper

(57) ABSTRACT

Systems and methods for device compatibility testing and reporting are disclosed. An exemplary method includes outputting, by a testing computer station, instructions for executing a plurality of certification tests on a device under test. The method includes receiving result indications and corresponding certification test identifiers corresponding to each of the plurality of certification tests, and generating, by the testing computer station, compressed test results for each of the plurality of certification tests. The method includes combining at least a portion of the compressed test results into a reduced data report. The method includes sending, by a computer network in communication with the testing computer station and a remote server, the reduced data report to the remote server.

20 Claims, 5 Drawing Sheets

(51) Int. Cl.
*G06F 11/36* (2006.01)
*G06F 11/26* (2006.01)
*G06F 17/30* (2006.01)

(52) U.S. Cl.
CPC .... *G06F 11/3692* (2013.01); *G06F 17/30345* (2013.01); *G06F 17/30477* (2013.01); *G06F 11/3688* (2013.01)

(56) References Cited

U.S. PATENT DOCUMENTS

| | | | |
|---|---|---|---|
| 7,757,121 B1 | 7/2010 | Perron et al. | |
| 8,302,050 B1* | 10/2012 | Hollander | G06F 11/26 716/106 |
| 8,438,545 B1* | 5/2013 | Almog | G06F 11/3692 717/126 |
| 2009/0300249 A1* | 12/2009 | Moyer | G06F 11/2236 710/260 |
| 2010/0332904 A1* | 12/2010 | Bloching | G06F 11/2294 714/32 |
| 2014/0032637 A1* | 1/2014 | Weir | G01R 31/2834 709/203 |
| 2014/0109037 A1 | 4/2014 | Ouali | |
| 2015/0058680 A1 | 2/2015 | Kortti et al. | |
| 2016/0117235 A1* | 4/2016 | Mishra | G06F 11/368 714/38.1 |
| 2016/0224460 A1* | 8/2016 | Bryant | G06F 8/61 |

FOREIGN PATENT DOCUMENTS

| | | |
|---|---|---|
| EP | 1691276 A2 | 8/2006 |
| EP | 1890235 A1 | 2/2008 |
| WO | 2013087982 A1 | 6/2013 |

OTHER PUBLICATIONS

"Foreign Office Action", Chinese Application No. 201610751468.3, dated Jun. 19, 2018, 20 pages.

"Foreign Office Action", European Application No. 15182745.8, dated Aug. 20, 2018, 10 pages.

* cited by examiner

SYSTEMS AND METHODS FOR DEVICE COMPATIBILITY TESTING AND REPORTING

CROSS-REFERENCE TO RELATED APPLICATION

This application claims priority to and the benefit of European Patent Application Serial No. 15182745.8, which was filed on Aug. 27, 2015. The entire contents and substance of the aforementioned application are hereby incorporated by reference in their entirety as if fully set forth herein.

BACKGROUND

Certain software operating ecosystems are designed to operate on various mobile computing device brands and models, for example, which may be designed and manufactured by different original equipment manufacturers (OEMs). One benefit associated with multiple manufacturers making devices that are compatible with the operating ecosystem is that each OEM can customize certain features and functionality of their devices. By building a fully compatible computing device, the OEMs and end users can benefit from the huge pool of applications written for the ecosystem while increasing incentives for developers to build more applications. However, testing and certifying compatibility with the operating ecosystem can present certain challenges.

BRIEF DESCRIPTION OF THE FIGURES

Reference will now be made to the accompanying figures and flow diagrams, which are not necessarily drawn to scale, and wherein.

DETAILED DESCRIPTION

Figure 1:
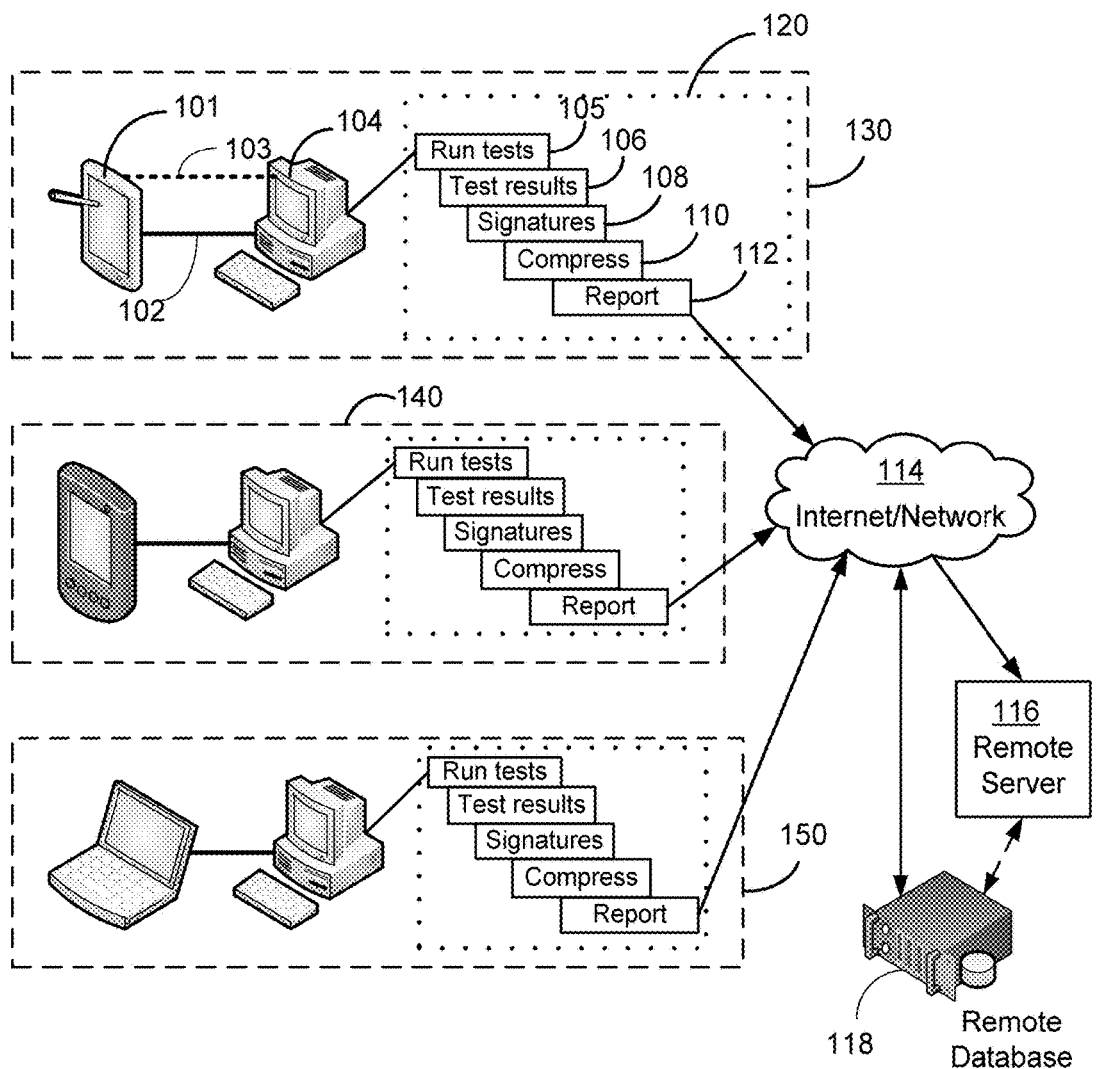
FIG. 1 is a block diagram of illustrative device testing and certification systems, according to an example implementation of the disclosed technology.

Some or all of the challenges associated with testing and certifying device compatibility with an operating ecosystem may be addressed by certain implementations of the disclosed technology. Certain implementations may include systems, methods, and apparatus for device compatibility testing and reporting. Some implementations of the disclosed technology will be described more fully hereinafter with reference to the accompanying drawings. This disclosed technology may, however, be embodied in many different forms and should not be construed as limited to the implementations set forth herein.

According to an example implementation, a method includes outputting, by a testing computer station in communication with a device under test, instructions for executing a plurality of certification tests on the device under test. The method can include executing the plurality of certification tests on the device under test. The method includes receiving test result indications and corresponding certification test identifiers corresponding to each of the plurality of certification tests. Responsive to receiving the result indications, the method includes generating, by the testing computer station, compressed test results for each of the plurality of certification tests, wherein each of the compressed test results includes a compressed certification test identifier; and combining, by the testing computer station, at least a portion of the compressed test results with non-compressed device information into a reduced data report. The method further includes sending, by a computer network in communication with the testing computer station and a remote server, the reduced data report to the remote server.

According to another example implementation, a system is provided. The system has a memory, for storing data and computer-executable instructions, and at least one processor in communication with the memory. The at least one processor is configured to execute the computer-executable instructions to cause the system to: output instructions to execute a plurality of certification tests on an electrical device under test; receive test result indications and certification test identifiers corresponding to each of the plurality of certification tests; generate, responsive to receiving the result indications, compressed test results for each of the plurality of certification tests, where of the compressed test results includes a compressed certification test identifier; combine non-compressed device information with at least a portion of the compressed test results into a reduced data report; and send, by a computer network in communication with the system and a remote server, the reduced data report to the remote server.

According to an example implementation of the disclosed technology a method includes receiving, receiving, at a remote server and by a computer network in communication with a testing computer station, a reduced data report. The reduced data report includes non-compressed device information as well as compressed result indications and certification test identifiers corresponding to each of a plurality of certification tests run on a device under test. The method includes storing, in a memory at the remote server, the received reduced data report. The method includes decompressing, by a processor in communication with the memory at the remote server, the compressed result indications and certification test identifiers to produce a decompressed file. The method includes determining, by the processor at the remote server, and from the decompressed file, whether all of the plurality of certification tests passed. Responsive to the determining that all of the plurality of certification tests passed, the method includes generating, by the processor at the remote server, a certification; and sending, by the computer network and to the testing computer station, and indication of the certification.

According to another example implementation, a system is provided. The system has a memory, for storing data and computer-executable instructions, and at least one processor in communication with the memory. The at least one processor is configured to execute the computer-executable instructions to cause the system to perform a method that includes receiving, at a remote server and by a computer network in communication with a testing computer station, a reduced data report. The reduced data report includes compressed result indications and certification test identifiers corresponding to each of a plurality of certification tests run on a device under test as well as non-compressed device information corresponding to the device under test. The method includes storing, in a memory at the remote server, the received reduced data report. The method includes decompressing, by a processor in communication with the memory at the remote server, the compressed result indications and certification test identifiers to produce a decompressed file. The method includes determining, by the processor at the remote server, and from the decompressed file, whether all of the plurality of certification tests passed. Responsive to the determining that all of the plurality of certification tests passed, the method includes generating, by the processor at the remote server, a certification related to the device information; and sending, by the computer network and to the testing computer station, and indication of the certification.

According to another example implementation, a system is provided. The system has a memory, for storing data and computer-executable instructions, and at least one processor in communication with the memory. The at least one processor is configured to execute the computer-executable instructions to cause the system to: output instructions to execute a plurality of certification tests on an electrical device under test; receive test result indications and certification test identifiers corresponding to each of the plurality of certification tests; generate, responsive to receiving the result indications, compressed test results for each of the plurality of certification tests, where of the compressed test results includes a compressed certification test identifier; combine at least a portion of the compressed test results with non-compressed device information into a reduced data report; and send, by a computer network in communication with the system and a remote server, the reduced data report to the remote server.

As electronic devices get more complicated and support more hardware and software features, compatibility testing becomes more complex. Groups of tests are often run in order to verify that specific units of code, application programming interfaces (APIs), and more complex functions of the electronic device performed as expected. Additionally, compatibility tests often provide helpful debugging information when the device under test (DUT) does not pass an individual test. In order to obtain compatibility certification, sometimes the results of comprehensive compatibility tests are transferred to a certifying party. These comprehensive compatibility-testing results can include the individual results of thousands of separate tests including not only individual use cases but also robustness testing for when the device is under stress and performance testing for comparing the test results against given benchmarks.

When the testing software is part of an open-source ecosystem, individual tests are written in a high-level programming language and testing results are provided in a human-readable format with the name of the test, the test result (e.g., pass or fail), and details regarding failure if available. This allows an equipment manufacturer to more quickly isolate the failure and fix it. In an open-source ecosystem, the failure may be caused by the device hardware under test, the device software under test, or even the testing software itself. Thus, the high-level programming language of the testing software and the human-readable test results provide a benefit when testing equipment. These "easy to read" elements, however, create problems when attempting to certify equipment, because the comprehensive compatibility testing may create large test-result files that are difficult to transfer to the certifying party.

Other implementations, features, and aspects of the disclosed technology are described in detail herein and are considered a part of the claimed disclosed technology. Other implementations, features, and aspects can be understood with reference to the following detailed description, accompanying drawings, and claims.

Certain example implementations of the disclosed technology is utilized to enable testing and efficient reporting of compatibility and/or test certification(s) of various computing devices for use within an operating ecosystem. Certain example implementations disclosed herein may provide improved efficiency for generation, storage, and/or utilization of certain device test, certification, and/or compatibility reports (herein referred to as "reports").

FIG. 1 depicts illustrative device testing and certification systems, according to certain example implementations of the disclosed technology. For example, a first device testing and certification system 130 can reside on-site at a first OEM, a second system 140 can reside on-site at a second OEM, a third system 150 can reside on-site at a third OEM and so forth. In another example implementation, a particular OEM may manufacture multiple device models and may have multiple systems 140, 150, 160 on-site for testing/certifying their various device models.

In accordance with an example implementation of the disclosed technology, a device under test (DUT) 101 is in communication with a testing computer station 104. For example, a hard-wired connection 102, such as via a USB port and appropriate cable, may be utilized to provide communications between the device under test 101 and the testing computer station 104. In another example implementation, a wireless connection 103 such as WiFi or Bluetooth may be utilized to provide communications between the device under test 101 and the testing computer station 104.

In certain example implementations, the testing computer station 104 is configured to initiate a series of certification tests for execution on the device under test 101. In an example implementation, the tests are run 105. In certain example implementations, after running the tests 105 on the device under test 101, the testing computer station 104 receives the test results 106. For tests that result in a "fail" determination, the device manufacturer may want to examine the test result details, the DUT hardware, and the DUT software to make modifications that will result in a "pass" determination upon re-running the individual test or a related grouping of tests. When all the tests pass, or when the manufacturer has exhausted its resources in determining how to convert "fails" to "passes," the testing computer station 104 generates result signatures 108, for example by concatenating certain field values from the test results 106, applies a data compression function 110 (such as a hash function) to the result signatures 108, and generates a reduced data report 112 for sending to a remote server 116 via a communications network 114. In certain example implementations, the reduced data report 112 also includes non-hashed or non-compressed data such as starting and ending time stamps for the certification testing, device information for the model of device under test, and/or indicators for hardware and/or software components and their key parameters.

In accordance with an example implementation of the disclosed technology, after the tests are run 105 and completed on the device under test 101, each of the hash results (i.e., compressed 110 test signatures) and corresponding (uncompressed) signatures 108 can be uploaded to a remote database 118, for example, to determine if that particular signature 108 and/or hash already exists in the remote database 118. If the uploaded hash already exists on the remote database 118, then no additional action may be needed. If the particular uploaded hash is not in the remote database 118, then both the pre-hash test signature 108 and post-hast compressed 110 test signature can be added to the database 118. In this way, the database 118 can be incrementally populated as new tests are added to the testing suite. In addition, because the hash value is unique, indexing, search, or other operations on this database 118 can be very fast.

In accordance with an example implementation of the disclosed technology, the remote database 118 can be accessible via the network 114. In certain example implementations, the remote database 118 can accessible via the remote server 116. In one example implementation, the remote database 118 can be publically accessible, with access only to non-confidential information. For example, a particular OEM 130 can access the remote database 118 to review certain test results, such as "[hash1]=[testABC:pass]" or "[hash2]=[testXYZ:fail]." In another example implementation, the remote database 118 can be private. In one example implementation, certain sensitive information on the remote database 118 (such as device- or OEM-specific information) is protected so that that it is viewable only upon presentation of proper credentials, such as a password.

In an example implementation, after the test report 112 (with included hash values) is uploaded to the remote server 116, the remote server 116 reads the database 118 again, replaces the hash value with the test signature 108, parses certain strings, and displays human-readable test information on a web site for review by the OEM. This human-readable test information can include not only the reconstructed (uncompressed) signatures but also the non-compressed data from the test report 112.

In accordance with certain example implementations of the disclosed technology, the initial test results 106 and/or the (compressed) reduced data report 112 can be formatted as text. The text format, for example, may provide certain advantages for testing and debugging. The initial test results 106 can be readable by a machine and/or a human, for example, to determine pass/fail status for each of the tests, and/or to determine debug or exception information for those tests that failed. According to an example implementation of the disclosed technology, the reduced data report 112 can also be formatted as text. In certain example implementations, the test results 106 and/or the reduced data report 112 can be reviewed (by machine and/or human) to determine the pass/fail status of the individual tests. However, in certain example implementations, the debug, exception, and/or verbose commentary information for those tests that failed can be omitted from the reduced data report 112 to further reduce the size of the reduced data report 112. In certain example implementations, the debug and/or commentary information for those tests that failed can be compressed/coded (for example, by a similar hash function as applied to the result signatures 108) and included in reduced data report 112.

As described above, certain example implementations of the disclosed technology utilizes a compression function 110 to reduce the number of characters (with corresponding reduction in the total data size) contained in the reduced data report 112. One of the motivating factors for compressing the initial test results 106 to produce the reduced size reduced data report 112 is that the remote server 116 may impose a limit on the size of any reports (or files) that are sent by the testing computer station 104 to the remote server 116. For example, certain servers may impose a data limit (for example, 20 MB) for any incoming reports/files. In certain testing scenarios, the device under test 101 can be subject to so many certification tests that the initial test results 106 (that can include test descriptors, headers, results, debug information, etc.,) could exceed the limit imposed by the remote server 116. Certain example implementations of the disclosed technology may extract and transform/compress certain test and/or device identification information from initial test results 106, for example to produce one or more codes (such as hash codes) that can be used to uniquely identify such information.

In one example implementation, the reduced data report 112 can be uploaded to the remote server 116 as a text file. For example, the reduced data report 112 can be uploaded to the remote server 116 as an XML text file, which can include any combination of non-compressed identifying information about the device under test 101, the test version in an uncompressed format, the various compressed test and/or test result identifiers, etc. In certain example implementations, the entire reduced data report 112 can be further compressed (as a ZIP, TAR or other suitable format file, for example) by the testing computer station 104 prior to uploading it to the remote server 116 to further reduce the file size. In an example implementation, applying the overall additional compression (ZIP, TAR) to the reduced data report 112 with already-hashed result signatures can be a completely independent compression function, and two different types of decompression (unZIP entire ZIPPED file; then unHASH individual hashed signatures) would be performed at the remote server 116.

In certain example implementations, the remote server 116 can receive the reduced data report 112. If the entire reduced data report 112 is compressed using an overall additional compression scheme, the remote server 116 decompresses the reduced data report 112. In an example implementation, after the overall additional decompression is completed (if needed), the reduced data test identifiers and/or test result (hash) codes contained in the reduced data report 112 can be extracted (either separately or in a single pass) by the remote server 116. This can be accomplished by either reversing the hash function or by using the remote database 118 to match a received hashed test-result signature with its corresponding pre-hash test-result signature in order to reconstruct the pre-hash test-result signature 108.

In accordance with an example implementation of the disclosed technology, the extracted reduced data test identifiers and/or test result (hash) codes may be compared (for example, at the remote database 118 via a look-up table populated with expected codes) for verification that certain tests passed on the device under test 101. In certain example implementations, when a received code does not match any of the entries in the look-up table, it may be an indicative of any one of several issues, including but not limited to: (1) the particular test related to the code did not pass; (2) the data was corrupted; (3) there is an error in the compression, transmission, reception, decompression process; and/or (4) the look-up table has not been updated with the latest testing codes.

In accordance with an example implementation of the disclosed technology, if not all of the expected codes for a particular class of the device under test 101 (as indicated by the device information) match with the expected or required codes in the look-up table (or other suitable database) at the server side, then certification of the device model or class may not be issued. On the other hand, and in accordance with an example implementation of the disclosed technology, if all of the expected codes for a particular class of the device under test 101 match with the expected or required codes in the look-up table (or other suitable database) at the server side, then certification of the device model (as indicated by the device information) may be issued to the OEM.

Figure 2:
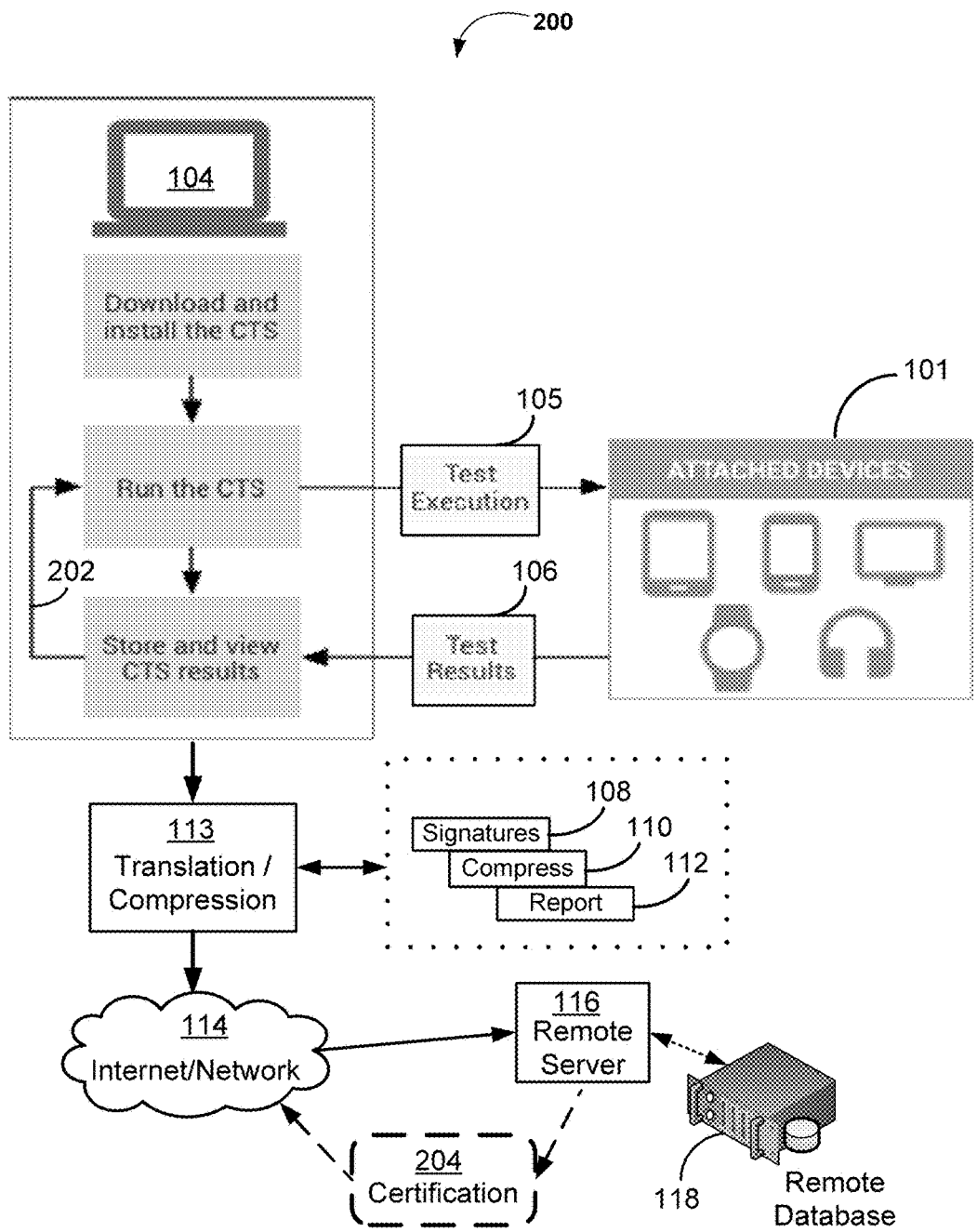
FIG. 2 illustrates an example device testing and certification system 200 and an associated process for testing and certifying a device under test 101, according to an example implementation of the disclosed technology.

FIG. 2 illustrates an example device testing and certification system 200, and an associated process for testing and certifying a device under test 101, according to an example implementation of the disclosed technology. For example, in one implementation, a device under test 101 is connected to the testing computer station 104 via a USB port. In an example implementation, a compatibility test suite application can be downloaded to (and/or installed on) the testing computer station 104. In certain example implementation, the compatibility test suite can detect and/or identify the connected device under test 101. The compatibility test suite can be launched to initiate the execution to run tests 105 on the device under test 101. According to an example implementation, and upon commencement of the tests, the compatibility test suite can generate initial test results 106.

In certain example implementations, the initial test results 106 can be in the form of a text file or other suitable format. In one example implementation, the initial test results 106 can be reported as an XML file, such as shown in the example below in TABLE 1.

TABLE 1

EXAMPLE INITIAL TEST RESULTS 106 XML FILE

<?xml version='1.0' encoding='UTF-8' ?>
<TestResult testPlan="TestPlan-1" starttime="Tue Jun 30 18:12:11 2015" endtime="Wed Jul 01 11:39:58 2015" version="1.1" suite="TestSuite-1 ">
  <DeviceInfo>
   <DeviceDisplayInfo>
    <DisplayResolution width="480" />
   </DeviceDisplayInfo>
  </DeviceInfo>
  <Summary failed="9" notExecuted="0" timeout="0" pass="9999" />
  <TestPackage name="TestExample-1" appPackageName="com.mobile.test1" >
   <TestSuite name="com">
    <TestSuite name="mobile">
     <TestSuite name="test1">
      <TestCase name="TestDeviceFuncTest" priority="">
       <Test name="testBugreport" result="pass" starttime="Tue Jun 30 18:16:34 2015" endtime="Tue Jun 30 18:17:24 2015" />
      </TestCase>
      <TestCase name="TestDeviceStressTest" priority="">
       <Test name="testWriteManyFiles" result="pass" starttime="Tue Jun 30 18:17:35 2015" endtime="Tue Jun 30 18:27:20 2015"/>
      </TestCase>
     </TestSuite>
    </TestSuite>
   </TestSuite>
  </TestPackage>
</TestResult>

In accordance with an example implementation of the disclosed technology, the XML text file representation of the initial test results 106 (as depicted above in TABLE 1) can include headers, test descriptors, test results (pass/fail), debugging information, commentary, time stamps, etc. As such, the initial test results 106 can provide certain information about each of the tests that can assist a manufacturer in focusing upon and correcting any failed tests or incompatibilities that the device under test 101 may have with the operating ecosystem.

As discussed previously with respect to FIG. 1 above, certain example implementations of the disclosed technology may utilize the compatibility test suite running on the testing computer station 104 to translate and/or compress 110 the initial test results 106, for example, to generate a reduced data report 112 for sending to the remote server 116 via a network 114. In one example implementation, the reduced data report 112 may also be reported as an XML file, such as shown in the example below in TABLE 2.

TABLE 2

EXAMPLE REDUCED DATA REPORT 112 XML FILE

<?xml version='1.0' encoding='UTF-8' ?>
<TestResult testPlan="TestPlan-1" starttime="Tue Jun 30 18:12:11 2015" endtime="Wed Jul 01 11:39:58 2015" version="1.1" suite="TestSuite-1">
  <DeviceInfo>
   <DeviceDisplayInfo>
    <DisplayResolution width="480" />
   </DeviceDisplayInfo>
  </DeviceInfo>
  <Summary failed="9" notExecuted="0" timeout="0" pass="9999" />
  <id="921f12">
  <id="111b66">
</TestResult>

The example reduced data report 112, as shown in TABLE 2 above, is derived from the example initial test results 106, as shown above in TABLE 1. In an example implementation, and with continued reference to FIG. 2, the compression 110 processes can retain some information as non-compressed (such as the XML header, certain test information, device information relating to the model or class of DUT, indicators for one or more hardware components, indicators for one or more software components, indicators for key parameters of a hardware component, and/or indicators for key parameters of a software component) while reducing, compressing or eliminating other information associated with the testing. For example, the initial test results 106 result can include an XML header, test-related beginning and ending time stamps, device information including key hardware parameters, and certification test-result indications (e.g., pass or fail) and certification test identifiers corresponding to each of the certification tests. As another example, details from the initial test results 106 regarding failures of any individual test may be excluded from the test report 112.

In this example, the compression 110 processes can provide compressed certification test identifiers (for example, the compressed certification test identifiers id="921f12" and id="111b66" as shown above in TABLE 2) that can compactly represent the verbose certification test identifiers and the corresponding test-result indications (e.g., pass or fail) to each of the plurality of certification tests in the initial test results 106. For example, a compressed certification test identifier (i.e., id="921f12") can represent that a test (i.e., "testBugreport" from a package called "com.mobile.test1.TestExample1" using a test case called "TestDeviceFuncTest") passed without requiring all of the associated verbose information that may otherwise be present in the initial test results 106 (e.g., TestPackage name, TestSuite name, TestCase name, Test name, starting and ending time stamps for the single test, etc.). In an example implementation, all or part of the associated verbose information that can be present in the initial test results 106 can be utilized to generate the compressed certification test identifier. For example, starting and ending time stamps for individual tests may be eliminated from any test-result signature prior to hashing in order to reduce the variety of resulting compressed certification test identifiers. In certain example implementations, the starting and ending time stamps for the entire test plan (such as "TestPlan1") may be included in the test report 112 as uncompressed information.

Another example of initial test results 106 and the corresponding example reduced data report 112 is depicted below in TABLE 3 and TABLE 4. For example, certain test and result identifiers may be extracted from the initial test results 106 (as shown in TABLE 3) to produce a string unique to the test and result, such as: "CtsAdbTests; android.aadb; 979e222a3ac9dce455fed4fc71815fbac621d39e; com; android; cts; aadb; TestDeviceFuncTest; testBugreport; pass." In an example implementation, and upon hashing this string with the compression 110 process, the compressed certification test identifier can result in corresponding reduced code, such as 14090c, which can be represented in the reduced data report 112, as shown in TABLE 4 as id="14090c."

Similarly, and as a second example, the initial test results 106 corresponding to the second test (testPushFolderWithManyFiles) can be represented by the string "CtsAdbTests; android.aadb; 979e222a3ac9dce455fed4fc71815fbac621d39e; com; android; cts; aadb; TestDeviceStressTest; testPushFolderWithManyFiles; pass." Upon hashing this string with the compression 110 process, the compressed certification test identifier can result in corresponding reduced code, such as f51a57, which can be represented in the reduced data report 112 (as shown in TABLE 4) as id="f51a57." In an example implementation, and as will be further discussed below, if even one character in the string is different, the resulting hashed reduced code will be different.

TABLE 3

EXAMPLE INITIAL TEST RESULTS 106 XML FILE

```
<?xml version='1.0' encoding='UTF-8' standalone='no' ?><?xml-stylesheet type="text/xsl" href="cts_result.xsl"?>
    <TestResult testPlan="CTS" starttime="Tue Jun 30 18:12:11 BRT 2015" endtime="Wed Jul 01 11:39:58 BRT 2015" version="4.4" suite="CTS">
        <DeviceInfo>
          <OpenGlExtensions>
            <OpenGlExtension name="GL_OES_EGL_image" />
          </OpenGlExtensions>
        </DeviceInfo>
        <Summary failed="19" notExecuted="0" timeout="0" pass="24878" />
        <TestPackage name="CtsAdbTests" appPackageName="android.aadb" digest="979e222a3ac9dce455fed4fc71815fbac621d39e">
          <TestSuite name="com">
            <TestSuite name="android">
              <TestSuite name="cts">
                <TestSuite name="aadb">
                  <TestCase name="TestDeviceFuncTest" priority="">
                    <Test name="testBugreport" result="pass" starttime="Tue Jun 30 18:16:34 BRT 2015" endtime="Tue Jun 30 18:17:24 BRT 2015"/>
                  </TestCase>
                  <TestCase name="TestDeviceStressTest" priority="">
                    <Test name="testPushFolderWithManyFiles" result="pass" starttime="Tue Jun 30 18:17:35 BRT 2015" endtime="Tue Jun 30 18:27:20 BRT 2015"/>
                  </TestCase>
                </TestSuite>
              </TestSuite>
            </TestSuite>
          </TestSuite>
        </TestPackage>
    </TestResult>
```

TABLE 4

EXAMPLE REDUCED DATA REPORT 112 XML FILE

```
<?xml version='1.0' encoding='UTF-8' standalone='no' ?><?xml-stylesheet type="text/xsl" href="cts_result.xsl"?>
    <TestResult testPlan="CTS" starttime="Tue Jun 30 18:12:11 BRT 2015" endtime="Wed Jul 01 11:39:58 BRT 2015" version="4.4" suite="CTS">
        <DeviceInfo>
          <OpenGlExtensions>
            <OpenGlExtension name="GL_OES_EGL_image" />
          </OpenGlExtensions>
        </DeviceInfo>
        <Summary failed="19" notExecuted="0" timeout="0" pass="24878" />
        <Tests>
          <id="14090c">
          <id="F51a57">
        </Tests>
    </TestResult>
```

One example of how a certification test identifier can be initially compressed to produce the hash codes includes applying the SHA-1 cryptographic hash function. For example applying the function to a phrase such as: "The quick brown fox jumps over the lazy dog" may result in hexadecimal: 2fd4e1c67a2d28fced849ee1bb76e7391b93eb12, which may further be converted to a corresponding text encoded hash code: L9ThxnotKPzthJ7hu3bnORuT6xI=. Even a small change (such as one letter) in the original phrase will result in a different hash code. Certain example implementations utilize such a hash function, or similar compression technique to reduce at least a portion of the initial test results 106 to produce the compressed certification test identifier. As discussed above, and according to an example implementation, after the hash codes are generated and included in the reduced data report 112, the entire reduced data report 112 can be further compressed using a different compression algorithm (ZIP, TAR, etc.) to further reduce the file size for sending to the remote server 116.

In one example implementation, the reduced data report 112 can be further converted to a binary format for sending to the remote server 116. In another example implementation, the reduced data report 112 can be encrypted before sending it to the remote server 116. In yet another example implementation, the reduce data report 112 can be further compressed in its entirety for transmission. The remote server 116 would then decompress the entire reduced data report 112 prior to reversing the hashing of the individual test results and determining whether any individual certification test identifier indicated a test failure. In one example implementation, a particular test failure may be implied or indicated by an omission of the particular test result. In this example implementation, if a single expected particular test result (for the particular model or class of device under test) is omitted, then the certification 204 may be denied. In another example implementation, a complete listing of each individual test result (e.g., pass/fail) may be included in the reduced data report 112, decompressed by the remote server 116, and analyzed by the remote server 116 for purposes of certification or debugging.

In accordance with an example implementation of the disclosed technology, the compatibility test suite running on the testing computer station 104 can include and combine the compressed certification test identifiers with a portion of the initial test results 106 into the reduced data report 112 for sending the reduced data report 112 to the remote server 116 via the internet or network 114.

With continued reference to FIG. 2, the reduced data report 112 can include information for which certification test passed and which ones failed. If all of the tests passed, the remote server 116, after receipt of the overall reduced data report 112, may apply an overall decompression (which can include unzipping, if appropriate), individual test result decompression (to reverse the hashing), analysis of the reconstructed test results from the report 112. and issuance of a certification 204 to the OEM. In certain example implementations, (and as indicated by the dashed lines and box), the process of releasing and sending the certification 204 is conditionally dependent upon all of the tests passing. According to an example implementation of the disclosed technology, the certification 204 can include identification information allowing the OEM to utilize the operating ecosystem on the device model that corresponds to the device information of the passing device under test 101, as represented in an unhashed manner in the reduced data report 112.

Certain example implementations of the disclosed technology can provide the technical benefit of enabling testing tools for OEM's to test, debug, and/or pass compatibility tests for each model of device hardware and/or each version of the operating system software. For example, an OEM can conduct the suite of thousands of compatibility tests to make sure that APIs and associated hardware/firmware/functions operate properly across all device platforms/builds. In certain example implementations, the reduced data report 112 can be sent to the remote server 116 so that the particular model corresponding to the device under test 101 can be certified, for example, for use with an operating system if all tests pass. Certain example implementations of the disclosed technology can also provide the technical effect of providing test failure and debug information results for test that fail so that the OEM can fix the related issues and run the test suite again.

In accordance with an example implementation of the disclosed technology, if all of the certification tests pass, the compatibility test suite running on the testing computer station 104 can generate a secure (for example, encrypted) key and a device/model identifier for sending to the remote server 116 to indicate that all of the tests passed. Such an implementation may provide a significant reduction in the size of the report 112 file that is sent to the remote server 116. In other example implementations, however, there can be situations in which the detailed information (such as test suite name, test case name, etc.) may be included in the report 112, for example, to enable a comparison of test results on different devices, to compare test result history on the same device, and/or to further provide debug information to correct various issues. For example, if a test failed previously but passed in a subsequent round, or passed previously then failed in the subsequent round, it may be useful to have such test information in the report 112 to further debug issues that may be present not only on the device under test 101, but also at any point in the testing chain from the testing computer station 104 all the way to the remote server 116.

According to various example implementations of the disclosed technology, the compatibility test suite test suite can be utilized to generate initial test results 106 in a report format that an OEM can utilize to fix bugs that correspond to test failure notifications. Certain example implementations of the initial test results 106 can include debugging information for tests that failed. In certain example implementations, the test results 106 can be stored and used in a feedback process 202 for debugging the device 101 based on the test results 106.

In accordance with an example implementation of the disclosed technology, when a particular device under test 101 has passed all tests, and the OEM is ready to upload the test results to the remote server 116, the testing computer station 104 uses a translation/compression module 113 to generate the reduced data report 112. In another example implementation, the testing computer station 104 generates a reduced data report 112 even though some tests did not pass. In an example implementation, for each test, a test signature 108 is created, by concatenating certain test information field contents. In certain example implementations, certain test result information is mapped or compressed into a shorter text string using an open-source algorithm, such as SHA (secure hash algorithm), MD5 (message-digest), bloom filter, etc.

In certain example implementations, a hash function (such as a cryptographic hash function) can be applied to certain initial test result information resulting in a hash code.

In an example implementation, a reference or remote database 118 can be checked to see if the generated hash code is already in the database 118. For example, and as discussed above, the hash code can represent a particular test signature. If the hash code is not already in the remote database 118, then certain implementations of the disclosed technology can add the generated hash code to the database 118. In certain example implementations, the initial test result 106 and associated descriptive information can also be added to the reference database 118 if it is not already present. This way, new tests can be added to the test suite, and corresponding descriptors/codes can be automatically added to populate the reference database if the new descriptors/codes are not already present in the database 118. In certain example implementations, the database 118 can reside locally with the OEM. In other example implementations, the database 118 can reside remotely, for example, at a remote server 116.

In an example implementation, an initial test result 106 can include descriptive information that can be transformed and/or concatenated into a signature 108 string such as: "testPackage name, test suites name, test case name, abi, test result." Such a signature 108 string may be 68 characters long, for example, and each character may require representation by 2 bytes of data, for a total of about 136 bytes of data to represent this one test result. By applying a hash function to the signature 108 string, the hash code result (921f12) may be only six characters (12 bytes for example), which potentially could reduce the report size by a factor of 10.

Certain example implementations of the disclosed technology can provide one or more of the additional technical improvements and/or benefits, such as: (1) reducing the size of a test report to save data storage space requirements and increase the transfer speed of the report to the remote server; (2) provide a predictable size for reporting each test result; (3) provide a reduced-size report that is still readable by both machine and human; (4) provide a unique hash code for each unique test; (5) provide a scalable test suite that allows tests to be removed or added; and/or (6) provide a quick search for test results.

The Android operating system provides one example of an ecosystem in which testing and certification reports can be critical to insure compatibility among devices made by the various OEMs. The Android operating system (OS), for example, designed for use on many different classes of electronic devices, including smartphones, tablets, watches, TV's, cars, etc. Android is a mobile operating system (OS) based on the Linux kernel and currently developed by Google. With a user interface based on direct manipulation, Android is designed primarily for touch screen mobile devices such as smartphones and tablet computers, with specialized user interfaces for televisions (Android TV), cars (Android Auto), and wrist watches (Android Wear). The OS has also been used in game consoles, digital cameras, regular PCs, and other electronics.

Google releases Android's source code under open source licenses, although most Android devices ultimately ship with a combination of open source and proprietary software, including proprietary software developed and licensed by Google. Android is popular with technology companies which require a ready-made, low-cost and customizable operating system for high-tech devices. Android's open nature has encouraged a large community of developers and enthusiasts to use the open-source code as a foundation for community-driven projects, which add new features for advanced users and/or bring Android to devices that were officially released running other operating systems. The Android/operating system's success has created certain challenges for testing, documenting, and certifying compatibility standards among the various OEMs.

Compatibility tests, for example, provide a consistent application and hardware environment to application developers and end users. Without a strong compatibility standard, devices can vary so greatly that developers may need to design different versions of their applications for different devices. The compatibility standard may provide a precise definition of what developers can expect from a compatible device, for example, in terms of APIs, interaction with hardware, etc. Developers, for example, can use the compatibility standard information to make good design decisions, and be confident that their apps will run well on any compatible device.

Certain example implementations of the disclosed technology may ultimately provide an enhanced and/or consistent experience for users of computing devices. For example, if an application runs well on one compatible Android device, it should run well on any other device that is compatible with the same Android platform version. Certain Android devices may differ in hardware and software capabilities, so the compatibility standard and reporting disclosed herein may also provide tools needed to implement appropriate filtering so that end users see only the applications they can actually run on their particular device.

In the foregoing description, numerous specific details have been brought forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a processor combined with one or more additional hardware components.

Various aspects described herein are presented as methods, devices (or apparatus), systems, and articles of manufacture that may include a number of components, elements, members, modules, nodes, peripherals, or the like. Further, these methods, devices, systems, and articles of manufacture may include or not include additional components, elements, members, modules, nodes, peripherals, or the like.

Figure 3:
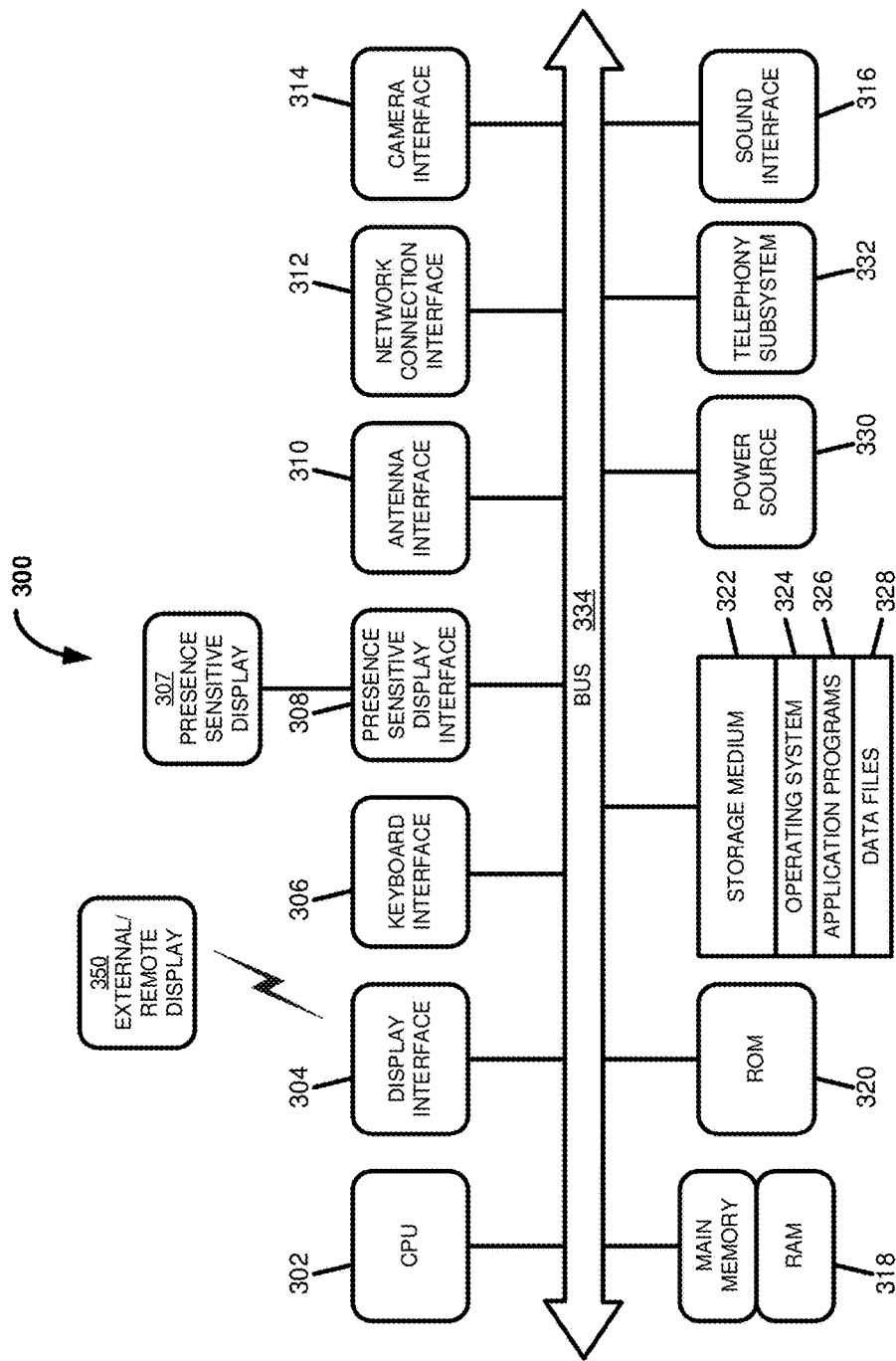
FIG. 3 is a block diagram of an illustrative computing system 300, according to an example implementation of the disclosed technology.

According to one example implementation, the terms computing device or mobile computing device, as used herein, may be a CPU, or conceptualized as a CPU (for example, the CPU 302 of FIG. 3). In certain example implementations, the computing device (CPU) may be coupled, connected, and/or in communication with one or more peripheral devices, such as display, navigation system, stereo, entertainment center, Wi-Fi access point, etc. In another example implementation, the term computing device or mobile computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In an example embodiment, the mobile computing device may output content to its local display and/or speaker(s). In another example implementation, the mobile computing device may output content to an external display device (e.g., over Wi-Fi) such as a TV or an external computing system.

Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

As used herein, unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Various implementations of the communication systems and methods herein may be embodied in non-transitory computer readable media for execution by a processor. An example implementation may be used in an application of a mobile computing device, such as a smartphone or tablet, but other computing devices may also be used, such as portable computers, tablet PCs, Internet tablets, PDAs, ultra mobile PCs (UMPCs), etc.

FIG. 3 depicts a computing device or computing device system 300, according to various example implementations of the disclosed technology. Certain aspects of FIG. 3 may be representative of the testing computer station 104, as shown in FIG. 1 and FIG. 2. Certain aspects of FIG. 3 may be embodied in a device under test 101. Certain aspects of FIG. 3 may be embodied in the remote server 116, as shown in FIG. 1 and FIG. 2. Certain aspects of FIG. 3 may be embodied in the remote database 118, as shown in FIG. 1 and FIG. 2. Various implementations and methods herein may be embodied in non-transitory computer readable media for execution by a processor. It will be understood that the computing device 300 is provided for example purposes only and does not limit the scope of the various implementations of the communication systems and methods.

The computing device 300 of FIG. 3 includes a central processing unit (CPU) 302, where computer instructions are processed; a display interface 304 that acts as a communication interface and provides functions for rendering video, graphics, images, and texts on the display. In certain example implementations of the disclosed technology, the display interface 304 may be directly connected to a local display, such as a touch-screen display. In another example implementation, the display interface 304 may be configured for providing data, images, and other information for an external/remote display 350 that is not necessarily physically connected to the computing device. For example, a peripheral device monitor may be utilized for mirroring graphics and other information that is presented on the computing device 300. In certain example implementations, the display interface 304 may wirelessly communicate, for example, via a Wi-Fi channel or other available network connection interface 312 to the external/remote display 350.

In an example implementation, the network connection interface 312 may be configured as a communication interface and may provide functions for rendering video, graphics, images, text, other information, or any combination thereof on the display. In one example, a communication interface may include: a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device 300 may include a keyboard interface 306 that provides a communication interface to a keyboard. In one example implementation, the computing device 300 may include a display interface 308 for connecting to a presence-sensitive display 307. According to certain example implementations of the disclosed technology, the display interface 308 may provide a communication interface to various devices such as a pointing device, a touch screen, a depth camera, etc. which may or may not be associated with a display.

The computing device 300 may be configured to use an input device via one or more of input/output interfaces (for example, the keyboard interface 306, the display interface 304, the display interface 308, network connection interface 312, camera interface 314, sound interface 316, etc.,) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 300 or may be a separate device. For example, the input device may be an accelerometer, a magnetometer, a digital camera, a microphone, and an optical sensor.

Example implementations of the computing device 300 may include: an antenna interface 310 that provides a communication interface to an antenna; a network connection interface 312 that provides a communication interface to a network, for example, for communication via the Internet to a remote server. As mentioned above, the display interface 304 may be in communication with the network connection interface 312, for example, to provide information for display on a remote display that is not directly connected or attached to the system. In certain implementations, a camera interface 314 is provided that acts as a communication interface and provides functions for capturing digital images from a camera. In certain implementations, a sound interface 316 is provided as a communication interface for converting sound into electrical signals using a microphone and for converting electrical signals into sound using a speaker. According to example implementations, a random access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, compatibility test suite application, and/or other applications, as necessary) and data files 328 are locally stored. According to an example implementation, the computing device 300 includes a power source 330 that provides an appropriate alternating current (AC) or direct current (DC) to power components. According to an example implementation, the computing device 300 may include and a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data may be stored in the RAM 318, where the computer CPU 302 may access the data during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a device under test to access computer-executable process steps, application programs and the like, stored on removable and non-removable memory media, to off-load data from the device under test or to upload data onto the device under test. A computer program product, such as one utilizing a communication system may be tangibly embodied in storage medium 322, which may include a machine-readable storage medium.

According to one example implementation, the term computing device, as used herein, may be a CPU, or conceptualized as a CPU (for example, the CPU 302 of FIG. 3). In this example implementation, the computing device (CPU) may be coupled, connected, and/or in communication with one or more peripheral devices, such as display or device under test. In another example implementation, the term computing device, as used herein, may refer to a device under test such as a smartphone, tablet computer, etc. In this example embodiment, the computing device may output content to its local display and/or speaker(s). In another example implementation, the computing device may output content to an external display device (e.g., over Wi-Fi) such as a TV or an external computing system.

An example method 400 for device compatibility testing and reporting will now be described with reference to the flowchart of FIG. 4. The method 400 may be performed by the testing computer station 104 of FIGS. 1-2. The method 400 according to an example implementation, includes outputting 402, by a testing computer station 104 in communication with a device under test 101, instructions for executing a plurality of certification tests on the device under test 101. The method 400 includes the testing computer station 104 receiving 404 result indications from the device under test 101 as well as corresponding certification test identifiers corresponding to each of the plurality of certification tests. Responsive to receiving the result indications, the method 400 includes generating 406, by the testing computer station 104, compressed test results for each of the plurality of certification tests, wherein each of the compressed test results includes a compressed certification test identifier; and combining, by the testing computer station 104, at least a portion of the compressed test results with non-compressed device information into a reduced data report 112. The method 400 includes sending 408, by a computer network 114 in communication with the testing computer station 104 and a remote server 116, the reduced data report 112 to the remote server 116.

Figure 4:
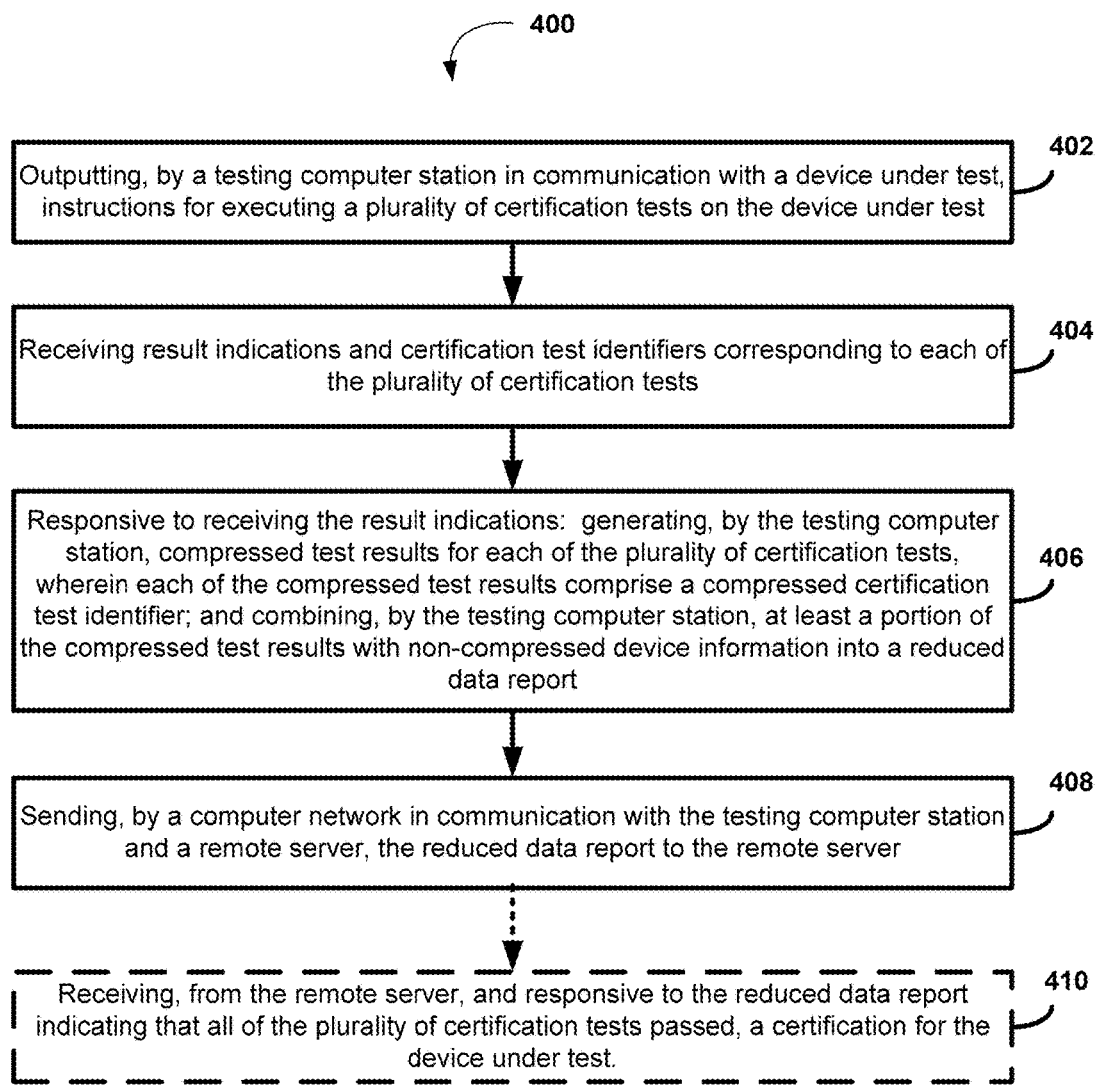
FIG. 4 is a flow diagram of a method 400 according to an example implementation.

The method 400 of FIG. 4 includes an optional step of receiving 410, from the remote server 116, and responsive to the reduced data report 112 indicating that all of the plurality of certification tests passed, an indication of a certification for the device under test 101.

Certain example implementations, include a system having a memory 318, 320, 322 for storing data and computer-executable instructions, and at least one processor 302 in communication with the memory 318, 320, 322, the at least one processor 302 is further configured to execute the computer-executable instructions to cause the system 300 to perform at least the process steps 402-408 as shown in FIG. 4.

In certain example implementations, generating the compressed test results includes applying a hash function to the signatures 108 that include certain certification test identifiers.

According to an example implementation of the disclosed technology, the reduced data report 112 may further include an uncompressed device identifier corresponding to the device under test. In certain example implementations, only the test identifier information is hashed, and any information identifying a particular OEM and/or device is not hashed, and is protected from being publically shared.

In an example implementation, the test result indications 106 may include debug information for any failed certification tests, and such information may be utilized in a feedback process 202 to fix any problems associated with a failed test. In an example implementation, the reduced data report 112 excludes debug information.

According to an example implementation of the disclosed technology, the test result indications 106 can include certain header information for the plurality of certification tests. In certain example implementations, the header information is not hashed. In an example implementation, the reduced data report 112 can exclude at least a portion of the header information.

According to an example implementation of the disclosed technology, the inclusion of the compressed certification test identifier in the reduced data report indicates that the device under test passed the corresponding certification test.

In certain example implementations, the plurality of certification tests may include at least one test to determine compatibility of the device under test with an operating system.

In an example implementation, the instructions for executing the plurality of certification tests on the device under test may include binary-formatted instructions.

In certain example implementations, the certification test identifiers and the reduced data report include text characters. In an example implementation, the certification test identifiers include a first number of text characters and wherein the reduced data report includes a second number of text characters, wherein the second number is less than ninety percent (90%) of the first number.

In an example implementation, the sending 408, by a computer network 114 in communication with the testing computer station 104 and a remote server 116, the reduced data report 112 to the remote server 116 may be based on determining, from the test result indications 106, that each of the plurality of certification tests passed.

Certain example implementations of the disclosed technology can include any permutation and/or combination of the various example implementations as disclosed herein. For example, the plurality of certification tests include at least one test to determine compatibility of the device under test with an operating system. This "compatibility" feature may further include one or more of the method 400 steps 402-410, as discussed with reference to FIG. 4. In certain example implementations, this "compatibility" feature and/or combination with other disclosed features may include, or be used with a reduced data report that excludes at least a portion of the header information. In certain example implementations, this "compatibility" feature and/or combination with other disclosed features may include, or be used with implementations in which result indications include header information for the plurality of certification tests. In certain example implementations, this "compatibility" feature and/or combination with other disclosed features may include combining the compressed test results into the reduced data report that includes at least a portion of uncompressed header information in the reduced data report. In certain example implementations, this "compatibility" feature and/or combination with other disclosed features may include, or be used with implementations in which the result indications include debug information for any failed certification tests, and wherein the reduced data report excludes debug information. In certain example implementations, this "compatibility" feature and/or combination with other disclosed features may include, or be used with implementations in which the device information includes hardware component information of the device under test. In certain example implementations, this "compatibility" feature and/or combination with other disclosed features may include, or be used with implementations in which the device information includes model information corresponding to the device under test. In certain example implementations, this "compatibility" feature and/or combination with other disclosed features may include, or be used with implementations where applying the hash function to the certification test identifiers generates test signatures corresponding to respective certification tests. In certain example implementations, this "compatibility" feature and/or combination with other disclosed features may include, or be used with implementations where generating the compressed test results comprises applying a hash function to the certification test identifiers.

Figure 5:
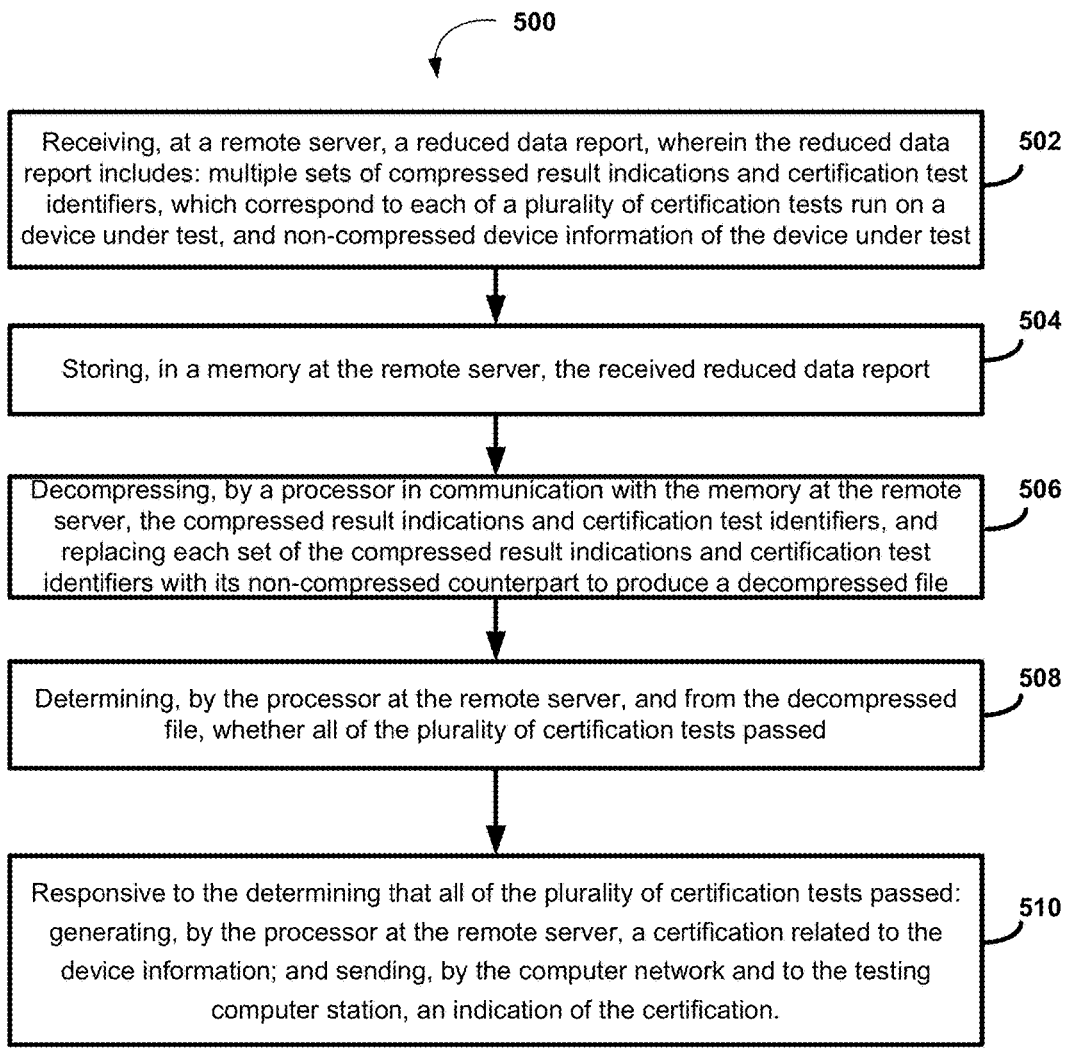
FIG. 5 is a flow diagram of a method 500 according to an example implementation.

An example method 500 for device compatibility reporting and certification will now be described with reference to the flowchart of FIG. 5. The method 500 may be performed by the remote server 116 of FIGS. 1-2, and embodied in FIG. 3. The method 500 according to an example implementation, includes receiving 502, at a remote server 116, a reduced data report 112, wherein the reduced data report 112 includes multiple sets of compressed result indications and certification test identifiers, which correspond to each of a plurality of certification tests run on a device under test 101. The reduced data report 112 also includes non-compressed device information such as a device model, class, or component identifier(s). The method 500 includes storing 504, in a memory 318 at the remote server 116, the received reduced data report 112. The method 500 includes decompressing 506, by a processor 302 in communication with the memory 318 at the remote server 116, the compressed result indication and certification test identifiers, and replacing each set of compressed result indication and certification test identifier with its non-compressed counterpart to produce a decompressed file. The method 500 includes determining 508, by the processor 302 at the remote server 116, and from the decompressed file, whether all of the plurality of certification tests passed. Responsive to the determining that all of the plurality of certification tests passed, the method 500 includes generating 510, by the processor 302 at the remote server 116, a certification 204; and sending, by the computer network 114 and to the testing computer station 104, an indication of the certification 204.

In certain example implementations, generating the certification 204 includes preparing a record that signifies that a model represented by the device under test 101 is compatible for use with an operating ecosystem.

In certain example implementations, the reduced data report 112 includes a combination of uncompressed test report information and compressed certification test identifiers and test results. The certification test identifiers and test results correspond to each of the plurality of the certification tests run on the device under test 101.

Certain example implementations can perform decompressing 506 by extracting a compressed result indication plus certification test identifier from the reduced data report 112, searching a database 118 for a matching non-compressed result indication and certification test identifier pair, and replacing the compressed result indication and certification test identifier with its decompressed counterpart from the database 118.

In accordance with an example implementation of the disclosed technology, the decompressing can include applying a de-hashing function to the compressed result indications and certification test identifiers corresponding to each of a plurality of certification tests run on a device under test 101.

In an example implementation, the inclusion of the compressed certification test identifier in the reduced data report 112 indicates that the device under test 101 passed the corresponding certification test.

As discussed above with regard to the "compatibility" feature, certain example implementations of the disclosed technology can include any permutation and/or combination of the various example implementations as disclosed herein.

In example implementations of the disclosed technology, the computing device 300 may include any number of hardware and/or software applications that are executed to facilitate any of the operations. In example implementations, one or more I/O interfaces may facilitate communication between the computing device 300 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device 300. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As desired, implementations of the disclosed technology may include the computing device 300 with more or less of the components illustrated in FIG. 3.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, having a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smartphones.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A computer-implemented method comprising:
outputting, by a testing computer station in communication with a device under test, instructions for executing a plurality of certification tests on the device under test;
receiving result indications and certification test identifiers corresponding to each of the plurality of certification tests, wherein the result indications comprise debug information for any failed certification tests;
responsive to receiving the result indications:
generating, by the testing computer station, compressed test results for each of the plurality of certification tests, wherein each of the compressed test results comprise a compressed certification test identifier; and
combining, by the testing computer station, at least a portion of the compressed test results with non-compressed device information into a reduced data report that excludes the debug information; and
sending, by a computer network in communication with the testing computer station and a remote server, the reduced data report to the remote server.

2. The method of claim 1, wherein generating the compressed test results comprises applying a hash function to the certification test identifiers.

3. The method of claim 2, wherein applying the hash function to the certification test identifiers generates test signatures corresponding to respective certification tests.

4. The method of claim 1, wherein the device information comprises model information corresponding to the device under test.

5. The method of claim 1, wherein the result indications comprise header information for the plurality of certification tests, and wherein combining the compressed test results into the reduced data report comprises including at least a portion of uncompressed header information in the reduced data report.

6. The method of claim 1, wherein an inclusion of the compressed certification test identifier in the reduced data report indicates that the device under test passed the corresponding certification test.

7. The method of claim 1, wherein the plurality of certification tests comprise at least one test to determine compatibility of the device under test with an operating system.

8. The method of claim 1, wherein the certification test identifiers and the reduced data report comprise text characters.

9. The method of claim 1, wherein the reduced data report is formatted as text.

10. The method of claim 1, further comprising an additional overall compression of the reduced data report to a ZIP or TAR format file.

11. A system comprising:
a port that connects the system to a device under test; and
a compatibility test suite application that when launched causes the system to:
output, via the port and to the device under test, instructions for executing a plurality of certification tests;
receive, via the port and from the device under test, result indications and certification test identifiers corresponding to each of the plurality of certification tests, wherein the result indications comprise debug information for any failed certification tests;
responsive to receiving the result indications:
generate compressed test results for each of the plurality of certification tests, wherein each of the compressed test results comprise a compressed certification test identifier; and
combine at least a portion of the compressed test results with non-compressed device information into a reduced data report; and
send, via a computer network in communication with the system and a remote server, the reduced data report to the remote server.

12. The system of claim 11, wherein generating the compressed test results comprises applying a hash function to the certification test identifiers.

13. The system of claim 11, wherein applying the hash function to the certification test identifiers generates test signatures corresponding to respective certification tests.

14. The system of claim 11, wherein the device information comprises model information corresponding to the device under test.

15. The system of claim 11, wherein the reduced data report includes the debug information.

16. The system of claim 11, wherein the reduced data report excludes the debug information.

17. The system of claim 11, wherein the result indications comprise header information for the plurality of certification tests, and wherein combining the compressed test results into the reduced data report comprises including at least a portion of uncompressed header information in the reduced data report.

18. The system of claim 11, wherein an inclusion of the compressed certification test identifier in the reduced data report indicates that the device under test passed the corresponding certification test.

19. The system of claim 11, wherein the plurality of certification tests comprise at least one test to determine compatibility of the device under test with an operating system.

20. The system of claim 11, wherein the certification test identifiers and the reduced data report comprise text characters.

* * * * *